A. G. WALDO.
Improvement in Friction Brakes or Clutches.
No. 115,792.　　　　　Fig. 1　　　　　Patented June 6, 1871.
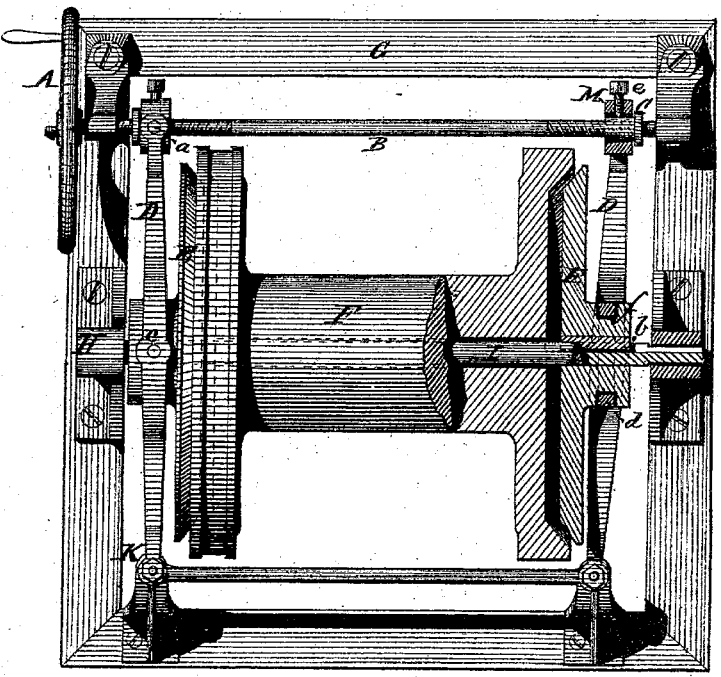
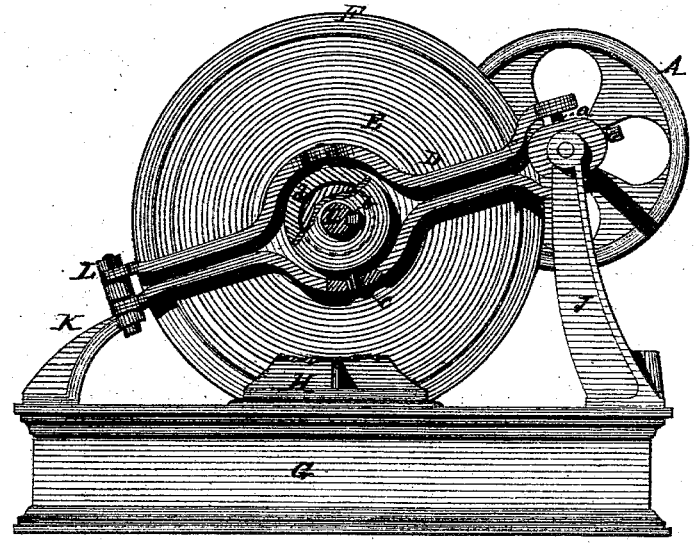
Fig. 2
Witnesses.　　　　　　　　　　　　　　Inventor.
Harry King.　　　　　　　　　　　　　Albert G. Waldo
Phil. T. Dodge　　　　　　　　　　　　by Dodge & Munn
　　　　　　　　　　　　　　　　　　　　his Attys

UNITED STATES PATENT OFFICE.

ALBERT G. WALDO, OF MILWAUKEE, WISCONSIN.

IMPROVEMENT IN FRICTION-BRAKES OR CLUTCHES.

Specification forming part of Letters Patent No. 115,792, dated June 6, 1871.

*To all whom it may concern:*

Be it known that I, ALBERT G. WALDO, of Milwaukee, in the county of Milwaukee and State of Wisconsin, have invented certain Improvements in Friction-Brakes, of which the following is a specification, reference being had to the accompanying drawing.

My invention relates to friction-brakes or clutches, and consists in the construction of a novel apparatus for applying-friction-brakes to the ends of a spool, drum, or other similar article of machinery, by means of certain mechanical devices, as hereinafter explained.

In the drawing, Figure 1 is a top-plan view, showing certain parts broken away and other parts in section, and Fig. 2 is an end view, in like manner showing certain parts broken away and other parts in section.

In constructing this apparatus a strong rectangular frame, G, is made out of any suitable materials, and upon it are placed and secured two stands, H, one on each side, provided at their upper ends with journal-boxes, in which is mounted a shaft, I, having a spool, drum, pulley, or other gear, F, running loosely thereon. Upon the same shaft I, and adjoining each end of the spool or other gear F, is placed a friction-wheel, E, working on feathers or splines $b$, connected to the shaft I, as clearly shown in Fig. 1. About the hub of each friction-wheel E is placed a loose ring, $d$, provided with projecting pins $c$, and outside of this ring $d$ is a button, $f$, provided with a shank, and connected to the hub of the spool or gear F and the shaft I by means of the feather or spline $b$, as shown in Fig. 1, so as to unite them together, and to let the ring run loosely in the recess thus made about the hub by means of the attachment of the button, the object of this recess being to prevent any lateral movement of the ring. It may be accomplished in any similar manner desired. On the rear end of the frame are also secured stands K, and to their upper ends are pivoted levers D, as shown in both figures. There are two of these levers pivoted to each of the stands, and they are curved at their middle portion, and provided with holes therein, so as to embrace loosely the loose ring $d$ and receive its pins $c$, as is clearly shown in Fig. 2. The front ends of these levers are also so curved as to embrace loosely and engage or receive pins $a$ on journals M, connected to nuts C by set-screws $e$, as shown in Fig. 1. The nuts C are on a shaft, B. This shaft is mounted in stands J on the front side of the frame, as shown in both figures, and is provided with a right-and-left screw-thread, which turns in the nuts C and moves them toward or away from each other, as desired. About these nuts are the journals M, with set-screws E for locking them together, and for allowing any desired lateral adjustment, should the parts become worn, or require it for any reason. The shaft B is provided with a hand-wheel, A, as shown in Fig. 1, for operating it.

In operating an apparatus thus constructed, for the purpose of applying the friction-wheels, it is only necessary to turn the hand-wheel A, which turns the shaft B and causes the nuts C to approach each other. As they are thus moved they draw the ends of the levers D together, which, in turn, bring the friction-wheels E to bear against the ends of the spool, drum, or gear F, thus producing a double friction, as is shown in Fig. 1.

By this construction it will be seen that, as the ends of the levers D turn loosely on their connections to the journals M, the strain on the nuts C is always in line with the shaft B, and that the strain is even.

If desired, for the purpose of increasing the friction, the ends of the spool, drum or gear F may have beveled recesses, and the friction-wheels E may be correspondingly beveled, so as to fit closely therein, as is clearly shown in Fig. 1. As this construction gives a greater amount of surface for contact, the friction is in like manner increased.

By the use of an apparatus thus constructed a simple method is provided of applying a similar uniform and powerful friction to each end of the spool, drum, or other gear, and in such a manner that it may be uniformly increased or diminished, as desired.

As the friction is applied at each end of the gear it becomes a double friction, and, being even or of the same degree at each end, it causes less wear and jar to the machinery with which the shaft I may connect it than when applied at only one end or place.

Having thus described my invention, what I claim is—

The application, simultaneously, to the opposite ends of a drum, spool, or similar gear, of friction-disks, by means of hinged levers, operated by right-and-left screws on a shaft, substantially as herein described, for the purpose of making the friction on each end of the drum, as set forth.

ALBERT G. WALDO.

Witnesses:
W. W. YALE,
GEO. C. MARKHAM.